Nov. 16, 1948.　　　G. N. COLE ET AL　　　2,454,037
ENGINE COOLING FAN
Filed Aug. 29, 1944　　　　　　　　　　　　　2 Sheets-Sheet 1
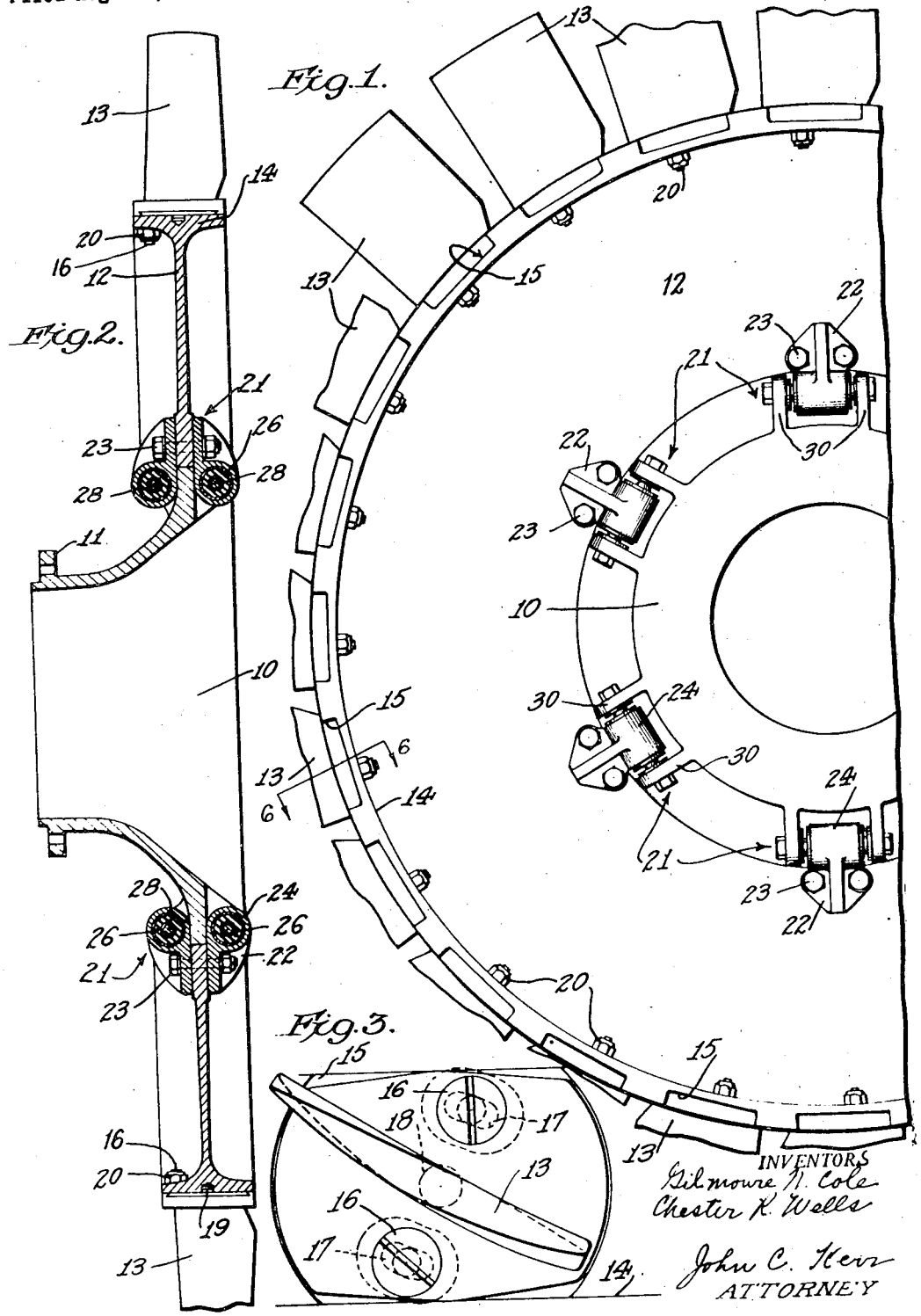
INVENTORS
Gilmoure N. Cole
Chester K. Wells
John C. Kerr
ATTORNEY Nov. 16, 1948.　　　G. N. COLE ET AL　　　2,454,037
ENGINE COOLING FAN
Filed Aug. 29, 1944　　　2 Sheets-Sheet 2
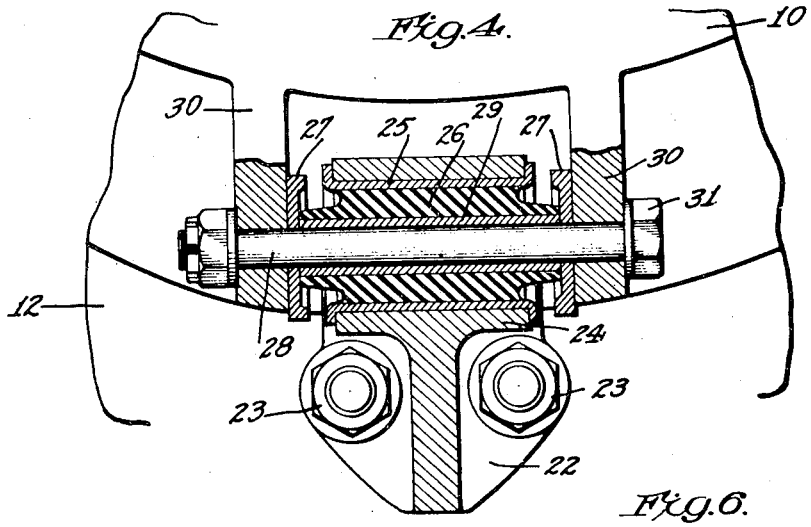
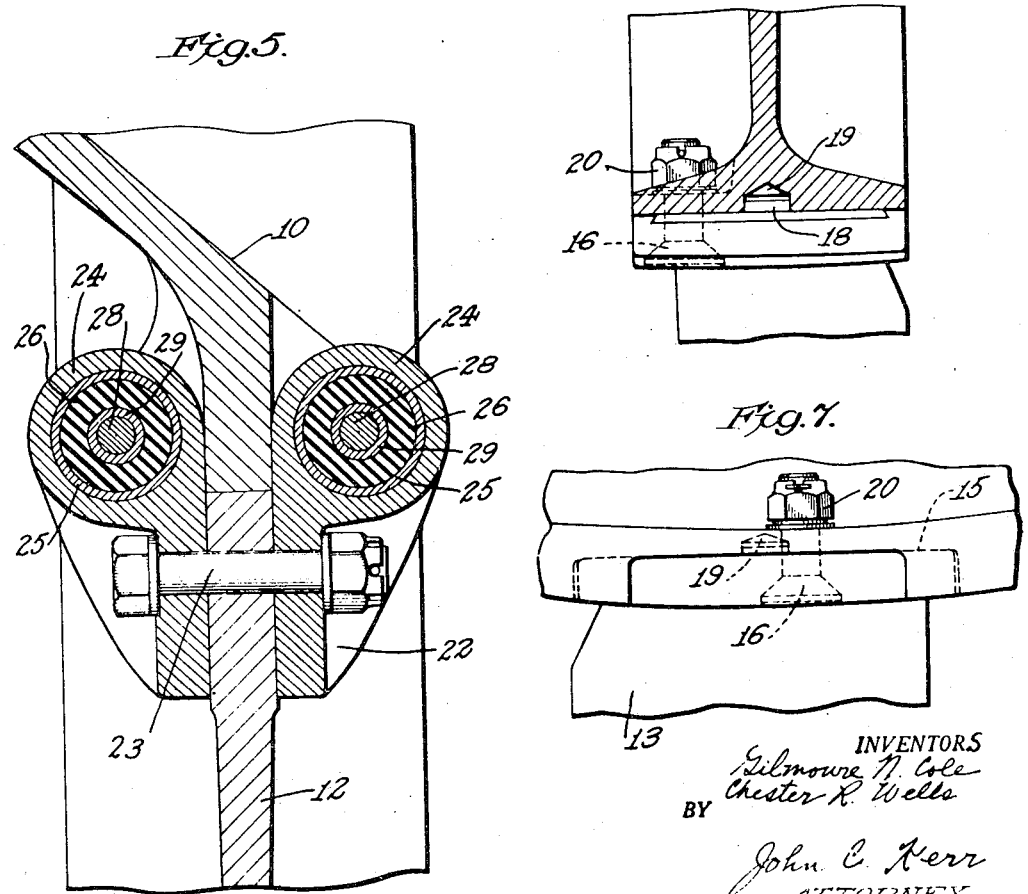
INVENTORS
Gilmoure N. Cole
Chester R. Wells
BY John C. Kerr
ATTORNEY Patented Nov. 16, 1948

2,454,037

UNITED STATES PATENT OFFICE 2,454,037

ENGINE COOLING FAN

Gilmoure N. Cole, Manchester, and Chester R. Wells, Rocky Hill, Conn., assignors to United Aircraft Corporation, East Hartford, Conn., a corporation of Delaware Application August 29, 1944, Serial No. 551,678

4 Claims. (Cl. 170—177)

This invention relates to engine cooling fans and has for its object to provide a novel and improved device of this type.

Another object of the invention is to provide a cooling fan which is especially adapted for use in submerged engine installations in aircraft and is lighter and at the same time more durable and efficient than the fans heretofore employed for this purpose.

Another object is to provide a cooling fan of the type having resiliently connected inner and outer hub members, with adjustable blades secured to the outer hub member, and embodying novel and improved details of construction and features of operation.

Still another object of the invention is to provide a cooling fan of the foregoing type wherein the connections between the inner and outer hub members are resilient in the torsional direction to dampen torsional vibrations but are stiff in fore and aft and radial directions to resist thrust, gyroscopic and eccentric loads.

Various other objects and advantages will be apparent as the nature of the invention is more fully disclosed.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Figure 1 is a plan view of an engine cooling fan embodying the invention;

Fig. 2 is a longitudinal sectional view thereof;

Fig. 3 is an end view of one of the adjustable fan blades;

Fig. 4 is a fragmentary plan view on an enlarged scale, showing one of the resilient connections between the inner and outer hub members in section;

Fig. 5 is a fragmentary sectional view of said resilient connection, corresponding with Fig. 2, but on an enlarged scale;

Fig. 6 is a detail section taken on line 6—6 of Fig. 1; and

Fig. 7 is a detail view on an enlarged scale, illustrating the mounting of the fan blades.

In the following description certain specific terms are used for convenience in referring to the various details of the invention. These terms, however, are to be interpreted as broadly as the state of the art will permit.

The engine cooling fan shown in the drawings comprises a circular inner hub member 10 which fits over a shaft and is drivingly connected with a suitable fan drive gear through the annular flange 11; and an annular outer hub member 12 which closely surrounds a substantially radially extending flange of the inner hub member, with only a small air gap therebetween, and carries the adjustable blades 13 of Formica or other suitable light-weight material.

The outer hub member 12 has a peripheral flange 14, and the fan blades 13 are secured in individual recesses or depressions 15 in this flange by pairs of bolts 16 which pass through arcuate slots 17 in the blades, as shown in Figs. 1 to 3. Dowel pins 18 on the bases of blades 13 engage in holes 19 in the flange 14 of hub member 12 for centering purposes. By loosening nuts 20 on bolts 16 the blades 13 may be adjusted angularly. In the embodiment illustrated, an angular adjustment of 15° may be obtained in this manner.

The outer hub member 12 is secured to the inner hub member 10 by a plurality of resilient connections 21 which are shown in detail in Figs. 4 and 5. The resilient mountings 21, here shown to be arranged in six spaced pairs on opposite sides of the hub members, each comprises a bracket 22 secured to the outer hub member 12 by bolts 23 and having formed integral therewith a cylindrical portion 24. Within the cylindrical portion 24 is secured a flanged sleeve 25 to which is bonded a rubber or other resilient bushing 26. The ends of resilient member 26 project and engage stop washers 27 after limited travel, as best shown in Fig. 4.

A rod or bolt 28 passes through the rubber bushing 26 and is preferably surrounded by a sleeve 29 within the bushing bonded to the rubber, and at its ends the bolt 28 is received in a pair of apertured lugs 30 projecting outwardly from the inner hub member 10, the bolt being secured in place by a nut 31.

Among the advantages of the foregoing construction may be mentioned: the small clearance between the inner and outer hub members 10 and 12 provides an air seal and a radial safety stop; the brackets 22 provide a stop for high gyroscopic loads; the washers 27 provide a stop for excessive torsional loads and a safety drive in case of rubber failure; the rubber drive bushings are soft and resilient in the torsional direction to dampen torsional vibrations but are stiff in fore and aft and radial directions to resist thrust, gyroscopic and eccentric loads; the major portion of the rubber bushing is protected from leakage oil; a hub with a single thin web of duralumin construction makes a light weight fan of adequate strength; the fan blades are readily adjustable in an angular direction; and the light weight blades which may be used in a fan of this construction reduce the loads in the hub.

Although a specific embodiment of the invention has been shown and described for purposes of illustration, it will be evident to those skilled in the art that the invention is capable of various modifications and adaptations within the scope and spirit of the appended claims.

What is claimed is:

1. A blower including a hub and fan blades, said hub comprising an inner hub member adapted to be driven by a source of power, an outer hub member carrying said fan blades, said inner hub member having a substantially radially extending flange, said outer hub member having an inwardly extending portion mechanically engaging and cooperating with said flange so as positively to prevent relative radial movement therebetween, resilient connections between said inner and outer hub members, each including a cylinder carried by said outer hub member, a cylindrical bushing of resilient material in said cylinder, and a rod in said cylindrical bushing having its ends projecting beyond said bushing and secured to said inner hub member, each of said cylindrical bushings and its associated rod being arranged with a common axis tangential with the axis of rotation of said hub members.

2. A blower in accordance with claim 1, wherein a plurality of said resilient connections are provided in a substantially equi-angular annular series, so that force transmitted between said inner and outer hub members will be substantially uniformly transmitted about the axis of said blower.

3. A blower in accordance with claim 1, wherein said resilient connections are arranged in a plurality of similar pairs, the members of each pair being opposite one another on opposite sides of the mechanically engaging portions of said flange and the associated parts of said outer hub member.

4. A blower in accordance with claim 1, wherein said resilient connections are arranged in a plurality of substantially equi-angularly disposed pairs of such connections, these pairs being arranged in an annular series about the axis of said blower, and the members of each pair being opposite one another on opposite sides of the mechanically engaging portions of said flange and the associated parts of said outer hub member.

GILMOURE N. COLE.
CHESTER R. WELLS.

REFERENCES CITED

The following references are of record in the file of this patent:

UNITED STATES PATENTS

| Number | Name | Date |
|---|---|---|
| 246,019 | Landis | Aug. 23, 1881 |
| 1,646,897 | Burns | Oct. 25, 1927 |
| 2,041,555 | Lee | May 19, 1936 |
| 2,145,542 | Gee | Jan. 31, 1939 |
| 2,207,362 | Thorne | July 9, 1940 |
| 2,207,376 | Gaubatz | July 9, 1940 |
| 2,354,101 | Broders | July 18, 1944 |
| 2,369,538 | O'Aubarede | Feb. 13, 1945 |
| 2,396,232 | Chilton | Mar. 12, 1946 |

FOREIGN PATENTS

| Number | Country | Date |
|---|---|---|
| 2,091 | Great Britain | 1869 |